(12) United States Patent
Sata et al.

(10) Patent No.: US 8,009,373 B2
(45) Date of Patent: Aug. 30, 2011

(54) LENS ACTUATOR

(75) Inventors: Norifumi Sata, Hyogo (JP); Hidekazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/957,508

(22) Filed: Dec. 1, 2010

(65) Prior Publication Data
US 2011/0141564 A1 Jun. 16, 2011

(30) Foreign Application Priority Data

Dec. 11, 2009 (JP) ................. 2009-281263
Aug. 2, 2010 (JP) ................. 2010-173355

(51) Int. Cl.
*G02B 7/02* (2006.01)
(52) U.S. Cl. ..... 359/824; 359/813; 359/814; 369/44.14; 369/44.22; 720/683
(58) Field of Classification Search .......... 359/811, 359/813, 814, 819, 823, 824; 369/44.14–44.16, 369/44.22, 244; 310/13, 15; 396/55; 720/683; 348/360, E5.028, E5.046
See application file for complete search history.

(56) References Cited

U.S. PATENT DOCUMENTS

| 4,766,584 | A | * | 8/1988 | Sekimoto et al. | ......... 369/44.15 |
| 7,394,603 | B2 | * | 7/2008 | Shiraki et al. | ................ 359/819 |
| 7,457,061 | B2 | | 11/2008 | Sata et al. | |

FOREIGN PATENT DOCUMENTS

JP 2008-32768 A 2/2008

* cited by examiner

*Primary Examiner* — Loha Ben
(74) *Attorney, Agent, or Firm* — RatnerPrestia

(57) ABSTRACT

A lens actuator includes a cylindrical carrier having a hollow for accommodating a lens, the hollow being formed in a first direction; a driving yoke for housing the carrier; a base for holding the yoke thereon; a driving magnet and a driving coil, which are fixed either to the outer periphery of the carrier or the driving yoke; a moving magnet fixed to the driving yoke; and a moving coil fixed to the base. The carrier is movable with respect to the driving yoke in the first direction, and the driving yoke is movable with respect to the base in a second direction perpendicular to the first direction. The driving magnet and the driving coil face each other in the second direction, and the moving magnet and the moving coil face each other in the first direction.

6 Claims, 11 Drawing Sheets back-and-forth direction right-and-left direction back-and-forth direction

LENS ACTUATOR

BACKGROUND OF THE INVENTION

1. Field of the Invention

The present invention relates to lens actuators mainly used for cameras and mobile phones.

2. Background Art

In recent years, an increasing number of cameras and mobile phones have come to use a lens actuator to auto focus the lens and to correct blurring. In line with this, there is a growing demand for easy-to-use and reliable lens actuators.

A conventional lens actuator will be described with reference to FIGS. 9 to 12. FIGS. 9 and 10 are a sectional view and an exploded perspective view, respectively, of the lens actuator. FIGS. 11 and 12 are partial perspective views of this lens actuator. As shown in FIG. 9, the lens actuator includes carrier 1, driving coil 2 (hereinafter, coil 2), driving yoke 3 (hereinafter, yoke 3), driving magnets 4 (hereinafter, magnets 4), spacer 5, upper spring 6, lower spring 7, and case 8.

Carrier 1 is made of an insulating resin, is substantially cylindrical, and is vertically movably housed in yoke 3. Coil 2 is made of a copper alloy of a substantially ring shape, and is wound around the outer periphery of carrier 1 and fixed thereto. Yoke 3 is made, for example, of iron, and is shaped like a box having a circular center hole. Magnets 4 are substantially arc-shaped, and are arranged facing each other on the inner wall of yoke 3 with a predetermined space from coil 2. Spacer 5 is made of an insulating resin, and covers the bottom surface of the outer periphery of yoke 3.

Upper and lower springs 6 and 7 are sheet metals. Case 8 is made of an insulating resin. Upper spring 6 is fixed in a slightly bent state to the top surface of yoke 3, and lower spring 7 is fixed to the top surface of case 8. Upper and lower springs 6 and 7 are in elastic contact with the top surface and the bottom surface, respectively, of carrier 1 so as to hold carrier 1 in position in the vertical direction, thereby forming drive unit 10 shown in FIG. 10.

The lens actuator further includes base 11, slider 12, support pins 13A and 13B, moving coils 14 (hereinafter, coils 14), moving magnets 15 (hereinafter, magnets 15), and cover 16.

Base 11 and slider 12 are made of an insulating resin. Slider 12 has support holes 12A into which columnar support pin 13A is inserted. Base 11 has holding members 11A into which both ends of support pin 13A are locked. As a result, slider 12 is mounted on base 11 movably in the back-and-forth direction.

Case 8 has support holes (not shown) into which support pin 13B is inserted. Slider 12 has holding members 12B into which both ends of support pin 13B are locked. As a result, drive unit 10 is mounted on slider 12 movably in the right-and-left direction.

Thus, drive unit 10 is movable with respect to base 11 via slider 12 both in the back-and-forth direction and in the right-and-left direction.

Coils 14 are made of a copper alloy wound in the shape of frames, and are fixed to the four side surfaces of yoke 3 of drive unit 10. Magnets 15 are substantially rectangular, and are arranged facing each other on the inner wall of cover 16 with a predetermined space from coils 14. Cover 16 is made of a metal, and is shaped like a box having a circular center hole.

As shown in FIG. 11, magnets 15 each have N and S poles arranged in the back-and-forth or right-and-left direction. Coils 14 facing magnets 15 each have an inward magnetic field B1, which is orthogonal to the vertical direction.

Base 11, slider 12, coils 14 (14A, 14B, 14C, 14D), and magnets 15 together form move part 18 shown in FIG. 12. Cover 16 covers move part 18 and drive unit 10.

The above-structured lens actuator with a lens (not shown) in the hollow of carrier 1 and an image pickup device behind the lens is attached to an electronic device such as a camera or a mobile phone. Driving coil 2 and moving coils 14 are connected to an electronic circuit (not shown) of the electronic device via lead wires or connectors (not shown).

In this electronic device, when the user lightly presses, for example, a push button (not shown) of camera, the electronic circuit applies voltage to coil 2 so as to supply current thereto. Magnets 4 and yoke 3 together form a magnetic field around magnets 4 directed inward or outward. As a result, coil 2 is subjected to a force in the vertical direction, which is orthogonal to the magnetic field. This allows carrier 1 including coil 2 wound therearound and fixed thereto to move in the vertical direction, allowing the auto focus to adjust the focal position of the lens in the hollow of carrier 1.

When the current supply to coil 2 is interrupted, carrier 1 is pressed by the biasing force of upper and lower springs 6 and 7 which are in elastic contact with the top surface and the bottom surface, respectively, of carrier 1. As a result, carrier 1 returns to the original position.

When the user strongly presses the push button of camera, causing blurring, the blurring is detected by the electronic circuit of the electronic device through, for example, a separate sensor (not shown). Then, the electronic circuit applies voltage to coils 14 so as to supply current thereto. As a result, coils 14 are subjected to a force in the back-and-forth or right-and-left direction. This allows yoke 3 of drive unit 10 including coils 14 fixed thereto to move in the back-and-forth or right-and-left direction, thereby correcting blurring.

When coils 14 having an inward magnetic field B1 around them are supplied with a clockwise current I1 as shown in FIG. 11, coils 14 are subjected to a forward force F1, thus moving drive unit 10 in the forward direction. When supplied with a counterclockwise current I2, on the other hand, coils 14 are subjected to a backward force F2, thus moving drive unit 10 in the backward direction.

Thus, in FIG. 12, drive unit 10 on slider 12 moves in the back-and-forth direction when current is supplied to moving coil 14A or 14B, and moves in the right-and-left direction when current is supplied to moving coil 14C or 14D.

In short, the auto focusing is performed by supplying current to coil 2 facing magnets 4 so as to vertically move carrier 1, thereby vertically moving the lens in the hollow of carrier 1. The shaking correction (optical image stabilization) is performed by supplying current to coils 14 facing magnets 15, thereby moving yoke 3 of drive unit 10 in the back-and-forth or right-and-left direction.

An example of a conventional technique related to the present invention is shown in Patent Literature 1.

In this conventional lens actuator, magnets 15 arranged outside carrier 1 have the magnetic field B1, which is directed toward the inside of carrier 1, that is, toward yoke 3 including coil 2 and magnets 4. Therefore, when having a strong magnetic force, magnets 15 affect coil 2 and magnets 4, possibly preventing carrier 1 from moving precisely in the vertical direction.

Citation List

Patent Literature 1: Japanese Patent Unexamined Publication No. 2008-32768

SUMMARY OF THE INVENTION

An object of the present invention is to provide a lens actuator which operates reliably and stably.

The lens actuator of the present invention comprises a cylindrical carrier, a driving yoke, a base, a driving magnet, a driving coil, a moving magnet, and a moving coil. The carrier has a hollow for accommodating a lens, the hollow being formed in a first direction. The driving yoke houses the carrier. The base holds the driving yoke thereon. The driving magnet is fixed to either the outer periphery of the carrier or the driving yoke. The driving coil is fixed also to either the outer periphery of the carrier or the driving yoke. The moving coil is fixed to one of the driving yoke and the base, and the moving magnet is fixed to the other. The carrier is movable with respect to the driving yoke in the first direction, and the driving yoke is movable with respect to the base in a second direction perpendicular to the first direction. When the driving magnet is fixed to the outer periphery of the carrier, the driving coil is fixed to the driving yoke. When the driving magnet is fixed to the driving yoke, the driving coil is fixed to the carrier. The driving magnet and the driving coil face each other in the second direction. The moving magnet and the moving coil face each other in the first direction.

The present invention provides a lens actuator which operates reliably and stably.

DETAILED DESCRIPTION OF THE INVENTION

Embodiments of the present invention will be described as follows with reference to FIGS. 1 to 8.

First Embodiment

Figure 1:
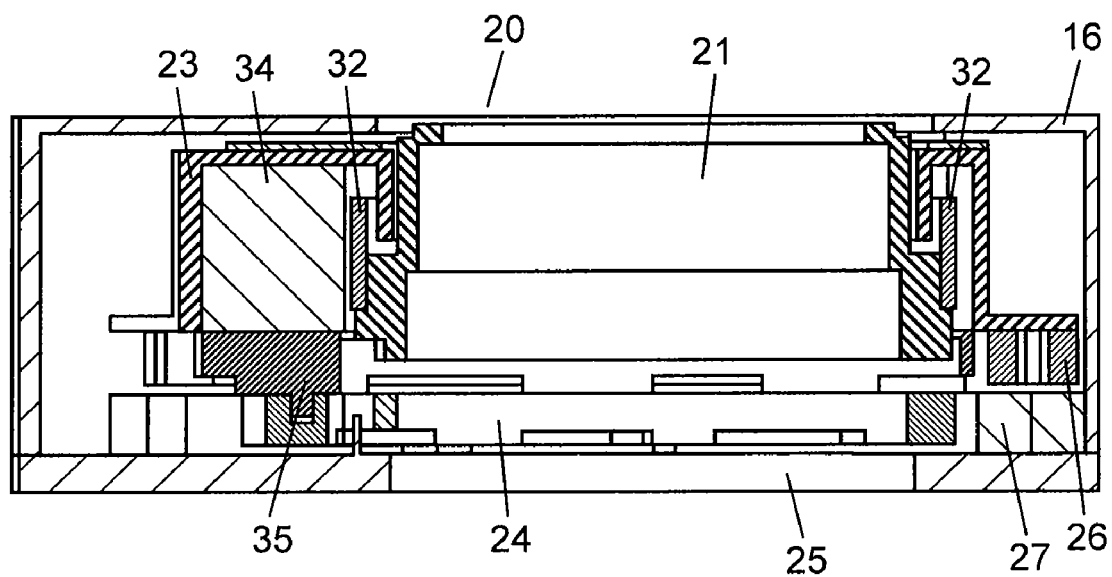
FIG. 1 is a sectional view of a lens actuator according to a first embodiment of the present invention.
Figure 2:
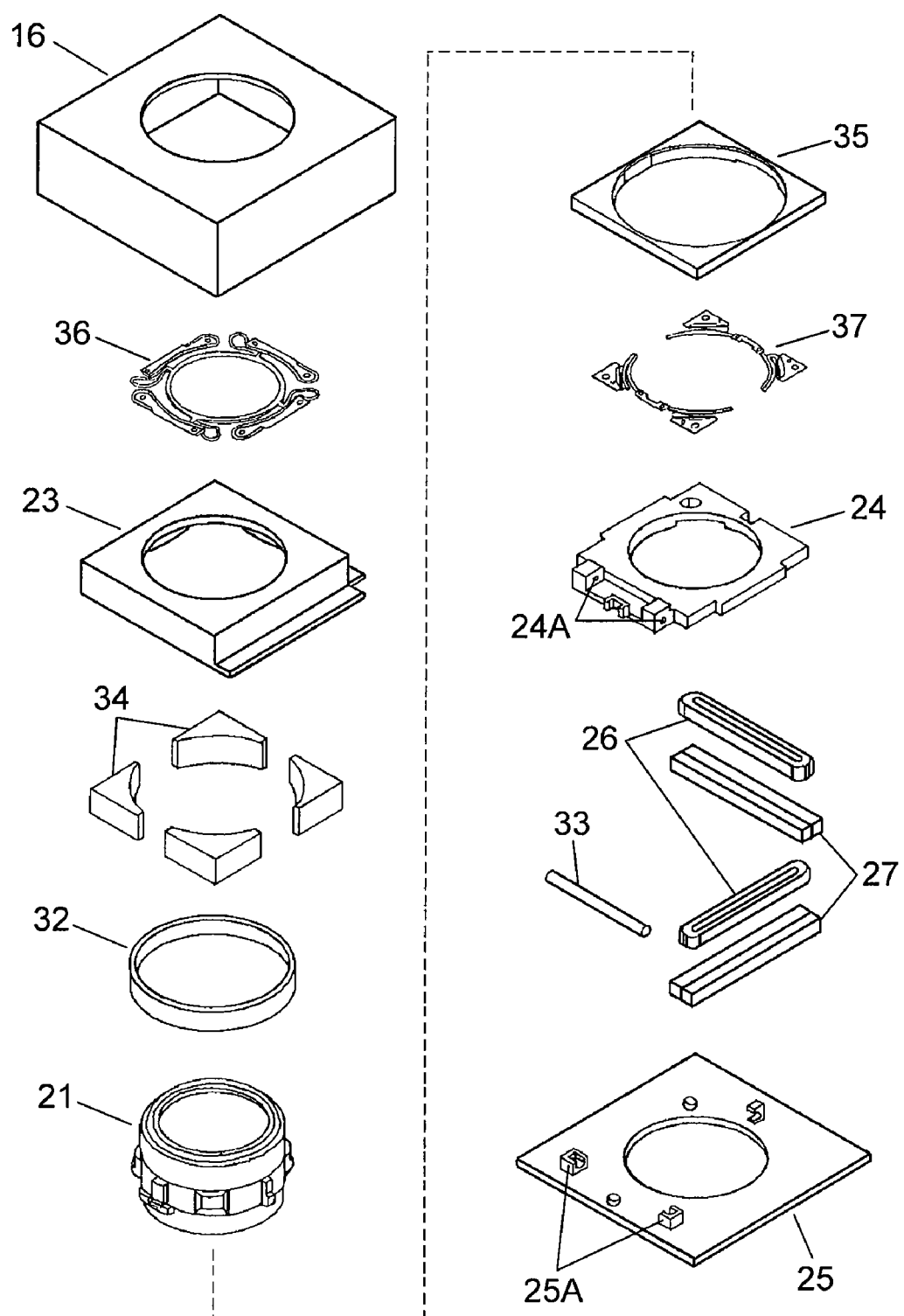
FIG. 2 is an exploded perspective view of the lens actuator according to the first embodiment of the present invention.

FIG. 1 is a sectional view of a lens actuator according to a first embodiment of the present invention. FIG. 2 is an exploded perspective view of this lens actuator. In FIG. 1, the lens actuator includes cylindrical carrier 21, driving yoke 23 (hereinafter, yoke 23), base 25, driving magnets 34 (hereinafter, magnets 34), driving coil 32 (hereinafter, coil 32), moving magnets 27 (hereinafter, magnets 27), and moving coils 26 (hereinafter, coils 26). Carrier 21 has a hollow for accommodating a lens. The hollow is formed in a first direction (the vertical direction in FIG. 1). Yoke 23 houses carrier 21 therein. Base 25 holds yoke 23. Magnets 34 are fixed either to the outer periphery of carrier 21 or yoke 23. Coil 32 is also fixed either to the outer periphery of carrier 21 or yoke 23. Magnets 27 are fixed to base 25. Coils 26 are fixed to yoke 23. Carrier 21 is movable with respect to yoke 23 in the first direction, and yoke 23 is movable with respect to base 25 in a second direction. The second direction is perpendicular to the first direction and corresponds to the back-and-forth and right-and-left directions in FIG. 1. When magnets 34 are fixed to the outer periphery of carrier 21, coil 32 is fixed to yoke 23. When magnets 34 are fixed to yoke 23, coil 32 is fixed to carrier 21. Magnets 34 and coil 32 face each other in the second direction. Magnets 27 and coils 26 face each other in the first direction.

The lens actuator further includes spacer 35, upper spring 36, lower spring 37, case 24, and support pin 33 as a support member.

Carrier 21 is made of an insulating resin such as glass-filled polycarbonate, and is housed in yoke 23 so as to be movable in the vertical direction (the first direction). Coil 32 is made of a copper alloy of a substantially ring shape and coated with an insulating resin, and is wound around the outer periphery of carrier 21 and fixed thereto via an adhesive or the like. Yoke 23 is made, for example, of iron, and is shaped like a box having a circular center hole.

Magnets 34 are made of a magnetic material such as neodymium, and are substantially arc-shaped. Spacer 35 is made of an insulating resin such as polyphthalamide, and covers the bottom surface of the outer periphery of yoke 23. Magnets 34, for example four magnets 34, are arranged facing each other in the second direction on the inner wall of yoke 23 with a predetermined space from coil 32.

Each of magnets 34 has different poles at its inner and outer peripheries. For example, it has N pole at its inner periphery and S pole at its outer periphery, thereby forming an inner or outer magnetic field orthogonal to the direction in which coil 32 is wound.

Upper spring 36 is fixed in a slightly bent state to the top surface of yoke 23, and lower spring 37 is fixed in the same manner to the top surface of case 24. Upper and lower springs 36 and 37 are in elastic contact with the top surface and the bottom surface, respectively, of carrier 21 so as to hold carrier 21 in position in the vertical direction. Case 24 and spacer 35 are adhesively bonded to each other. Similarly, spacer 35 and either yoke 23 or magnets 34 fixed to yoke 23 are adhesively bonded to each other. Thus, upper spring 36, yoke 23, magnets 34, coil 32, carrier 21, spacer 35, lower spring 37, and case 24 together form drive unit 20. Upper and lower springs 36 and 37 are sheet metals such as steel or a copper alloy. Case 24 is made of an insulating resin such as polyphthalamide.

Base 25 is made of an insulating resin. Case 24 has support holes 24A into which columnar support pin 33 is inserted. Holes 24A are long in the right-and-left direction. Base 25 has holding members 25A into which both ends of support pin 33 are locked. As a result, drive unit 20 including yoke 23 is movable with respect to base 25 in the second direction (in the back-and-forth and right-and-left directions).

Coils 26 are made of a copper alloy of a substantially elliptic cylinder shape and coated with an insulating resin, and are fixed to the bottom surface of the outer periphery of yoke 23. Magnets 27 are made of a magnetic material such as neodymium, and are shaped like square prisms. Magnets 27 are fixed to the front and right sides of the top surface of base 25 outside carrier 21. Coils 26 and magnets 27 are arranged facing each other with a predetermined space therebetween in the vertical direction (the first direction).

Cover 16 is made of a metal sheet such as nickel-plated steel, and is shaped like a box having a circular center hole.

Figure 4:
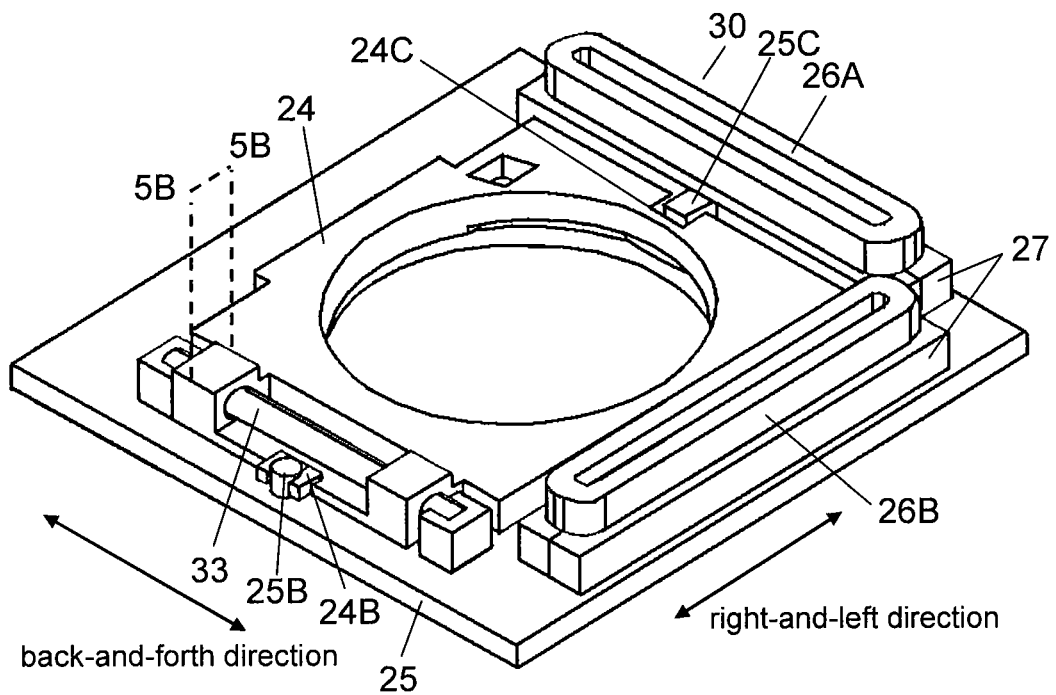
FIG. 4 is a partial perspective view of the lens actuator according to the first embodiment of the present invention.

FIG. 4 is a partial perspective view of the lens actuator according to the present embodiment. As shown in FIG. 4, base 25, coils 26(26A, 26B), magnets 27, and support pin 33 together form move part 30. Move part 30 and drive unit 20 are coated by cover 16 so as to form the lens actuator.

The above-structured lens actuator with a lens (not shown) in the hollow of carrier 21 and an image pickup device behind the lens is attached to an electronic device such as a camera or a mobile phone. Coil 32 and coils 26 are connected to an electronic circuit (not shown) of the electronic device via lead wires or connectors (not shown).

In this electronic device, when the user lightly presses, for example, a push button (not shown) of camera as the electronic device, the electronic circuit applies voltage to coil 32 so as to supply current thereto. Magnets 34 and yoke 23 together form a magnetic field directed inward or outward (the second direction). As a result, when supplied with current, coil 32 is subjected to a force in the vertical direction (the first direction) orthogonal to the magnetic field. This allows carrier 21 including coil 32 wound therearound and fixed thereto to move in the vertical direction, allowing the auto focus to adjust the focal position of the lens in the hollow of carrier 21.

When the current supply to coil 32 is interrupted, carrier 21 is pressed by the biasing force of upper and lower springs 36 and 37 which are in elastic contact with the top surface and the bottom surface, respectively, of carrier 21. As a result, carrier 21 returns to the original position.

When the user strongly presses the push button of camera, causing blurring, the following operations are performed. The blurring is detected by the electronic circuit of the electronic device through, for example, a separate sensor (not shown). Then, the electronic circuit applies voltage to coils 26 so as to supply current thereto. Coils 26 have a magnetic field directed in the vertical direction (the first direction) formed by magnets 27. As a result, coils 26 are subjected to a force in the back-and-forth or right-and-left direction according to the current supply. This allows yoke 23 including coils 26 fixed thereto to move in the back-and-forth or right-and-left direction (the second direction), thereby correcting blurring.

Figure 3:
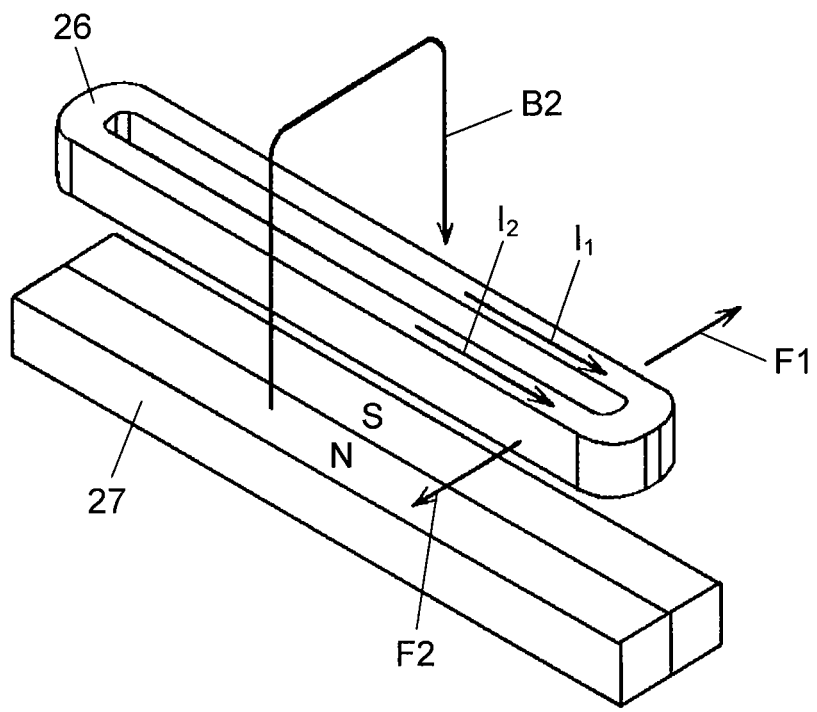
FIG. 3 is a partial perspective view of the lens actuator according to the first embodiment of the present invention.

The shaking correction (optical image stabilization) will be described as follows with reference to FIG. 3. FIG. 3 is a partial perspective view of the lens actuator according to the present embodiment. Magnets 27 form a magnetic field B2 directed, for example, downward around coils 26. At this moment, when supplied with a clockwise current 11, coils 26 are subjected to a rightward force F1, thus moving drive unit 20 including yoke 23 rightward. When supplied with a counterclockwise current 12, on the other hand, coils 26 are subjected to a leftward force F2, thus moving drive unit 20 including yoke 23 leftward.

Thus, in FIG. 4, drive unit 20 moves in the right-and-left direction when current is supplied to the right-side coil 26A, and moves in the back-and-forth direction when current is supplied to the front-side coil 26B.

Figure 5A:
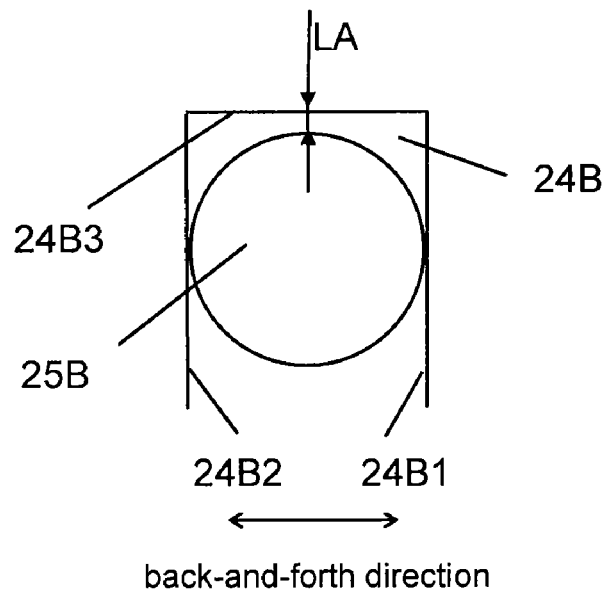
FIG. 5A is a partially enlarged top view of the lens actuator according to the first embodiment of the present invention.

The above-described burring correction will be described in more detail with reference to FIGS. 5A, 5B, and 5C. FIG. 5A is an enlarged top view of a joint between projection 25B of base 25 and groove 24B of case 24. As shown in FIG. 5A, groove 24B has inner surfaces 24B1, 24B2, and 24B3, and projection 25B is in contact with inner surfaces 24B1 and 24B2, which face each other in the back-and-forth direction of groove 24B. The contact is not very tight, so that when current is supplied at least to the right-side coil 26A, drive unit 20 can slide in the right-and-left direction, while projection 25B is guided by inner surfaces 24B1 and 24B2. Projection 25B is slightly spaced from or in contact with inner surface 24B3 of groove 24B. In the following description, it is assumed that projection 25B is spaced from inner surface 24B3 by a margin LA as shown in FIG. 5A for convenience of explanation.

Figure 5B:
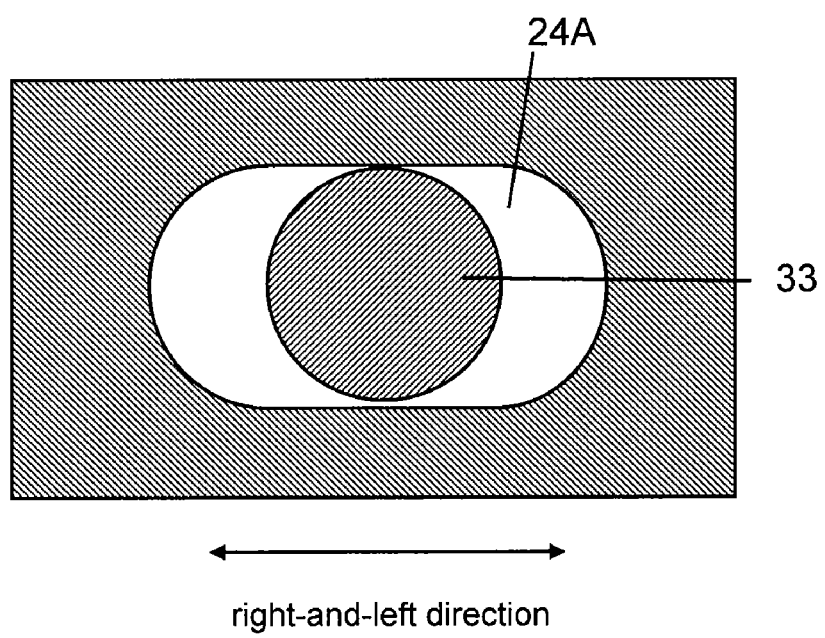
FIG. 5B is a partial sectional view of the lens actuator according to the first embodiment of the present invention.

FIG. 5B is a sectional view taken along a line 5B-5B of FIG. 4, and more specifically, is a partial sectional view of support holes 24A of case 24 and support pin 33. As shown in FIG. 5B, support holes 24A have flat parallel top and bottom surfaces in the right-and-left direction, which are connected together so as to have four round corners. Support pin 33 has a smaller diameter than the distance between the top and bottom surfaces of support holes 24A in the vertical direction. Between support pin 33 and support holes 24A, there is a predetermined gap, which allows support pin 33 to slide inside support holes 24A in the right-and-left direction. In other words, support holes 24A, that is, case 24 is movable with respect to support pin 33 in the right-and-left direction of FIG. 4.

Figure 5C:
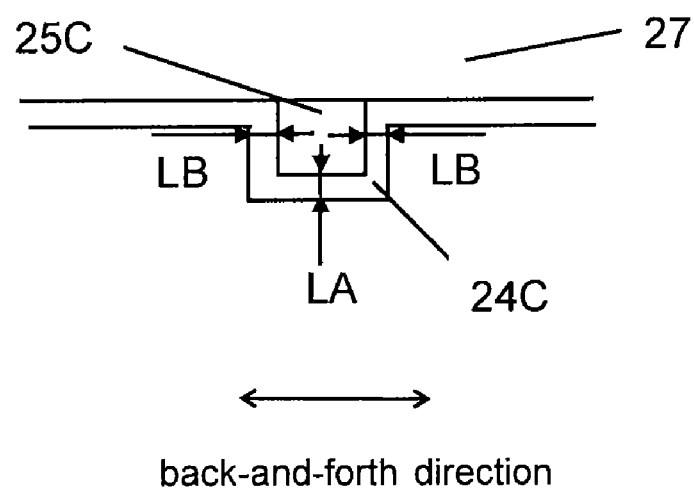
FIG. 5C is a partially enlarged top view of the lens actuator according to the first embodiment of the present invention.
Figure 6:
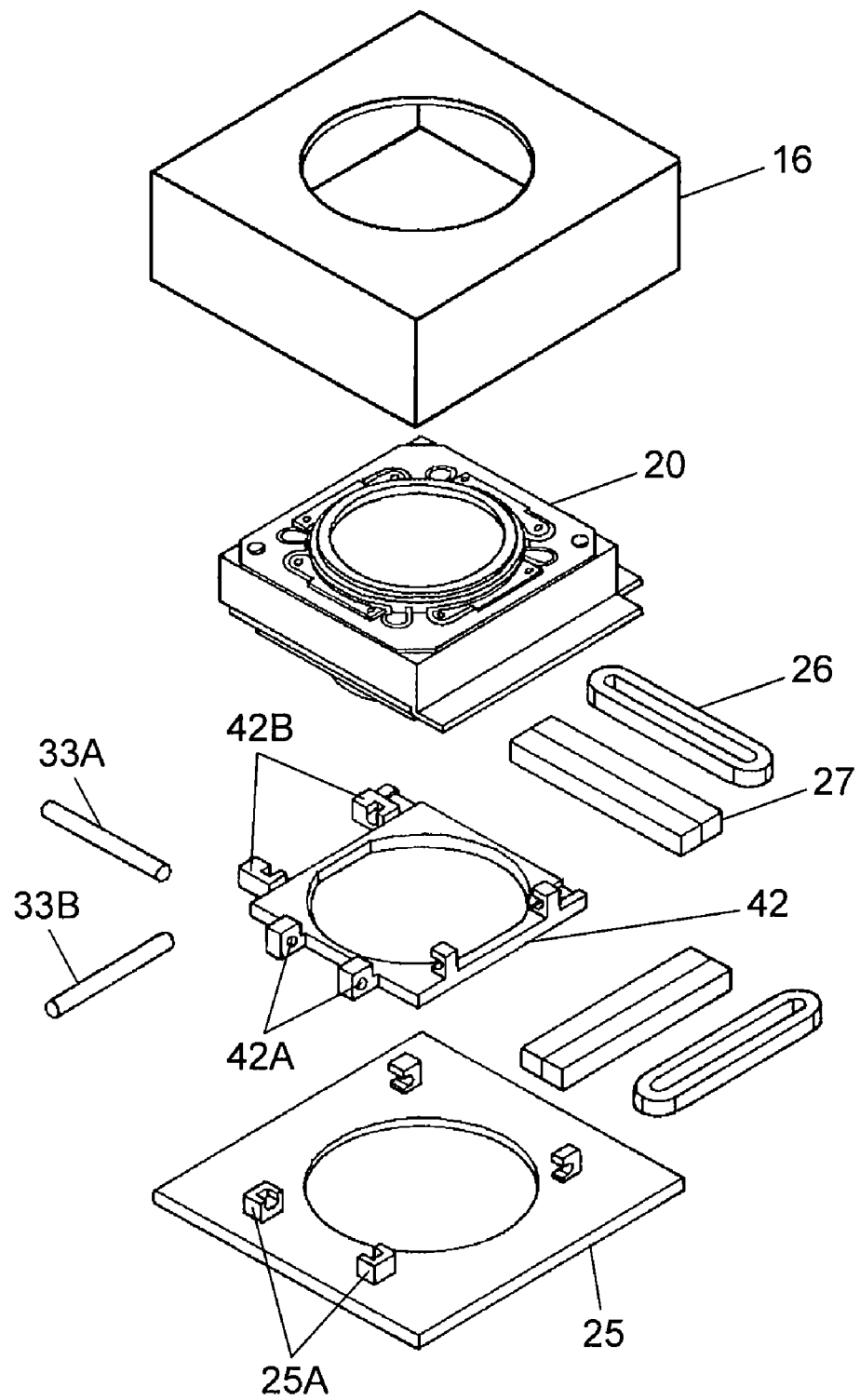
FIG. 6 is an exploded perspective view of another lens actuator according to the first embodiment of the present invention.

FIG. 5C is an enlarged top view of a joint between fixing member 25C of base 25 and recess 24C of case 24. As shown in FIG. 5C, fixing member 25C of base 25 is spaced from recess 24C of case 24 by a margin LB on each side in the back-and-forth direction, and by the margin LA in the right-and-left direction.

For example, when coil 26A shown in FIG. 4 is supplied with current, coil 26A and yoke 23 to which coil 26A has been fixed are subjected to a force in the right-and-left direction. Yoke 23 is fixed to case 24 via magnets 34 and spacer 35. Therefore, yoke 23 can move up to the distance corresponding to the sum of the margin LA between inner surface 24B3 of groove 24B and projection 25B shown in FIG. 5A, and the margin LA between fixing member 25C and recess 24C in the right-and-left direction shown in FIG. 5C. In short, yoke 23 can move up to the distance in the right-and-left direction twice as long as the margin LA. In this case, support pin 33 is made out of contact with the left and right ends of support holes 24A in FIG. 5B, allowing yoke 23 to move smoothly in the right-and-left direction.

When coil 26B is supplied with current, coil 26B and yoke 23 to which coil 26B has been fixed are subjected to a force in the back-and-forth direction. Yoke 23 is fixed to case 24 via magnets 34 and spacer 35 as described above. On the other hand, projection 25B is in contact with inner surface 24B1 or 24B2 as shown in FIG. 5A, and the margin LB is provided between fixing member 25C and recess 24C on each side in the back-and-forth direction as shown in FIG. 5C. As a result, case 24 moves while rotating in the back-and-forth direction about the abutment between projection 25B and either inner surface 24B1 or 24B2. The margins LA and LB can be large enough to allow case 24 to move within ±0.1 mm or so on base in the back-and-forth and right-and-left directions. Therefore, the above-described rotation is apparently almost equivalent to sliding in the back-and-forth direction.

With this structure, case 24 and yoke 23 fixed thereto can move with respect to base 25 in the back-and-forth and right-and-left directions (the second direction) only by case 24 and base 25. As a result, the desired movement can be achieved by a small number of components. Alternatively, however, coils 26 and magnets 27 can be arranged oppositely: magnets 27 can be fixed to yoke 23, and coils 26 can be mounted on base 25.

As described hereinbefore, the auto focusing is performed by supplying current to coil 32 facing magnets 34 so as to move carrier 21 in the vertical direction (the first direction), thereby vertically moving the lens accommodated in its hollow. The shaking correction (optical image stabilization) is performed by supplying current to coils 26 facing magnets 27, thereby moving yoke 23 of drive unit 20 in the back-and-forth and right-and-left directions (the second direction).

As shown in FIG. 3, magnets 27 each have N and S poles arranged in the back-and-forth or right-and-left direction. Coils 26 facing magnets 27 in the vertical direction (the first direction) have a magnetic field B2 directed upward or downward from magnets 27.

In other words, the magnetic field B2 of magnets 27 arranged outside carrier 21 is directed not in the back-and-forth and right-and-left directions (the second direction) of yoke 23 in which coil 32 and magnets 34 are housed, but in the vertical direction (the first direction). Therefore, even when magnets 27 have a strong magnetic force, this magnetic force does not affect the magnetic field formed by coil 32 and magnets 34.

Thus, coil 32 and magnets 34 arranged inside can be prevented from being affected by the magnetic field B2 by arranging coils 26 and magnets 27 outside carrier 21 so as to face each other in the vertical direction (the first direction), and by directing the magnetic field B2 of magnets 27 in the vertical direction (the first direction). Thus, carrier 21 having the lens in its hollow moves reliably and stably in the vertical direction.

In the above description, case 24 is directly connected to base 25 via support pin 33 as shown in FIG. 4 so as to move on base 25 in the back-and-forth and right-and-left directions, thereby reducing the number of components. Alternatively, the present invention can be implemented by providing slider 42 shown in the exploded perspective view of FIG. 6 so that drive unit 20 can move with respect to base 25 via slider 42 in the back-and-forth and right-and-left directions.

Slider 42 has support holes 42A into which support pin 33A is inserted. Both ends of support pin 33A are locked into holding members 25A of base 25. As a result, slider 42 is mounted on base 25 movably in the back-and-forth direction. Case 24 of drive unit 20 has an annular support hole (not shown) into which support pin 33B is inserted. Slider 42 has holding members 42B into which both ends of support pin 33B are locked. As a result, drive unit 20 is mounted on slider 42 movably in the right-and-left direction.

With this structure, drive unit 20 can move with respect to base 25 via slider 42 in the back-and-forth and right-and-left directions.

In the above description, drive unit 20 is formed by winding and fixing coil 32 to the outer periphery of carrier 21 and by arranging magnets 34 to face coil 32. Alternatively, the present invention can be implemented by winding and fixing coil 32 to the inner periphery of carrier 21 and by arranging magnets 34 to face coil 32. Further alternatively, the present invention can be implemented by arranging magnets 34 on the outer or inner periphery of carrier 21 and by arranging coil 32 to face magnets 34.

In the above description, the lens actuator includes two moving magnets 27 and two moving coils 26, but alternatively may include one, three, or more magnets 27 and coils 26 to implement the present invention. When including only one magnet 27 and one coil 26, driving yoke 23 can be made movable with respect to base 25 only in the back-and-forth or right-and-left direction.

Thus, in the present embodiment, coils 26 and magnets 27 arranged outside carrier 21 face each other in the vertical direction (the first direction). The magnetic field B2 of magnets 27 outside carrier 21 is directed in the vertical direction (the first direction), and therefore, does not affect coil 32 and magnets 34 arranged inside magnets 27. Thus, carrier 21 having the lens in its hollow moves reliably and stably.

Second Embodiment

A second embodiment of the present invention will be described as follows. Like components are labeled with like reference numerals with respect to the first embodiment, and these components are not described again in detail.

Figure 7:
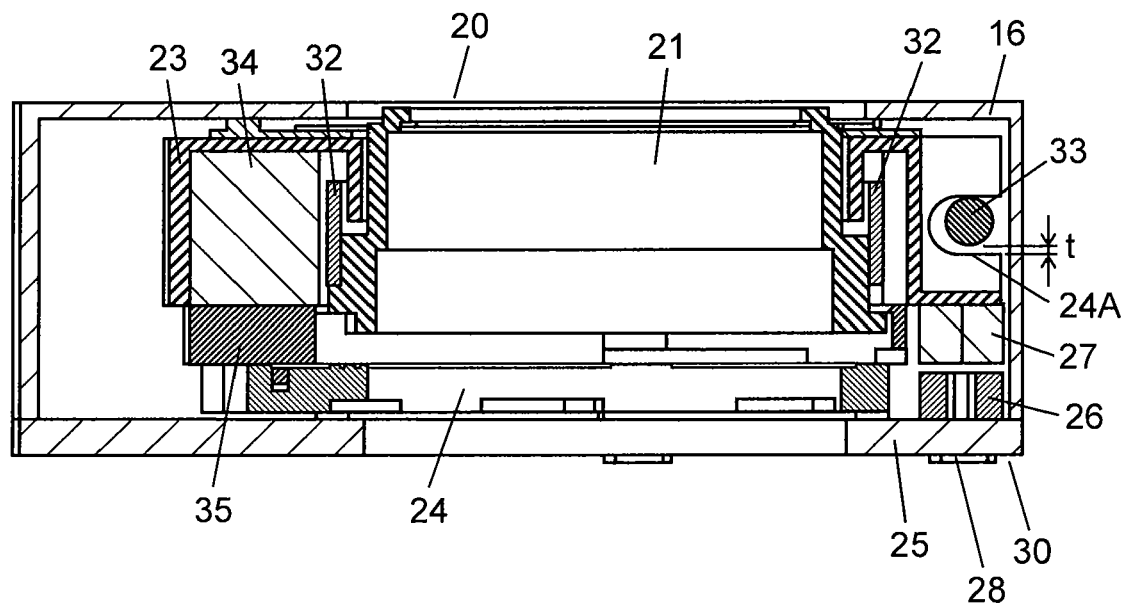
FIG. 7 is a sectional view of a lens actuator according to a second embodiment of the present invention.
Figure 8:
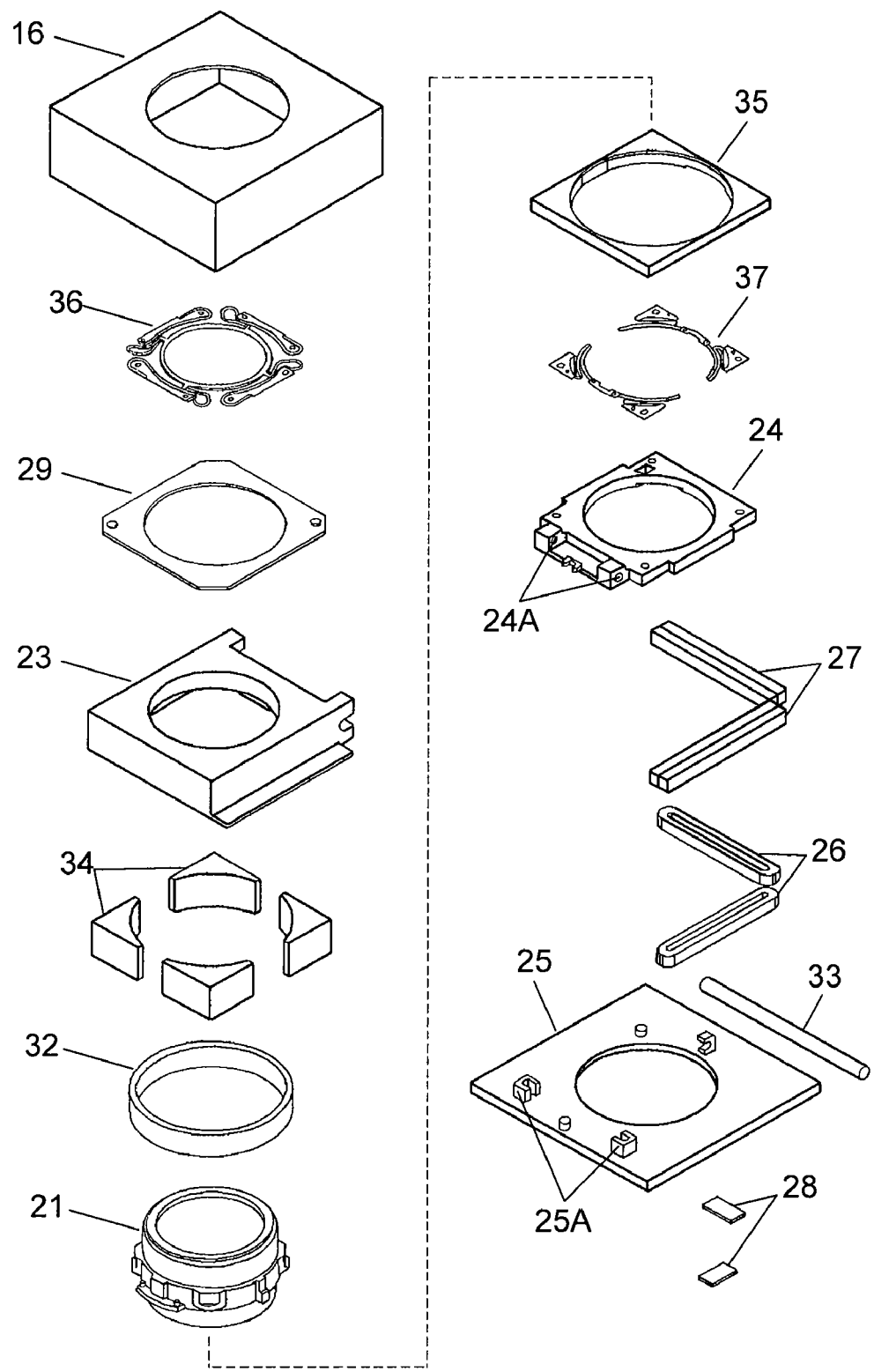
FIG. 8 is an exploded perspective view of the lens actuator according to the second embodiment of the present invention.
Figure 9:
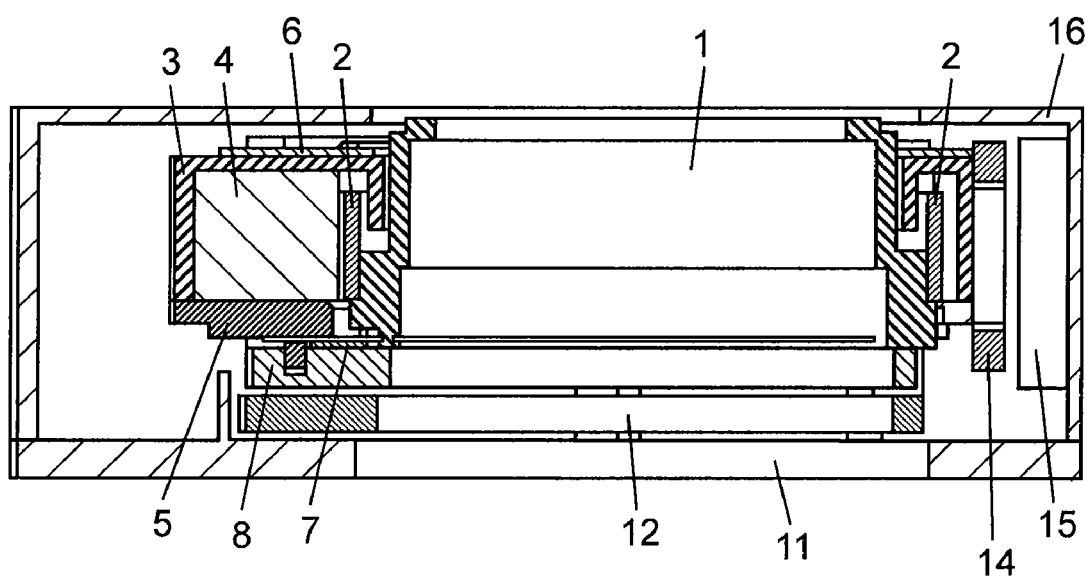
FIG. 9 is a sectional view of a conventional lens actuator.
Figure 10:
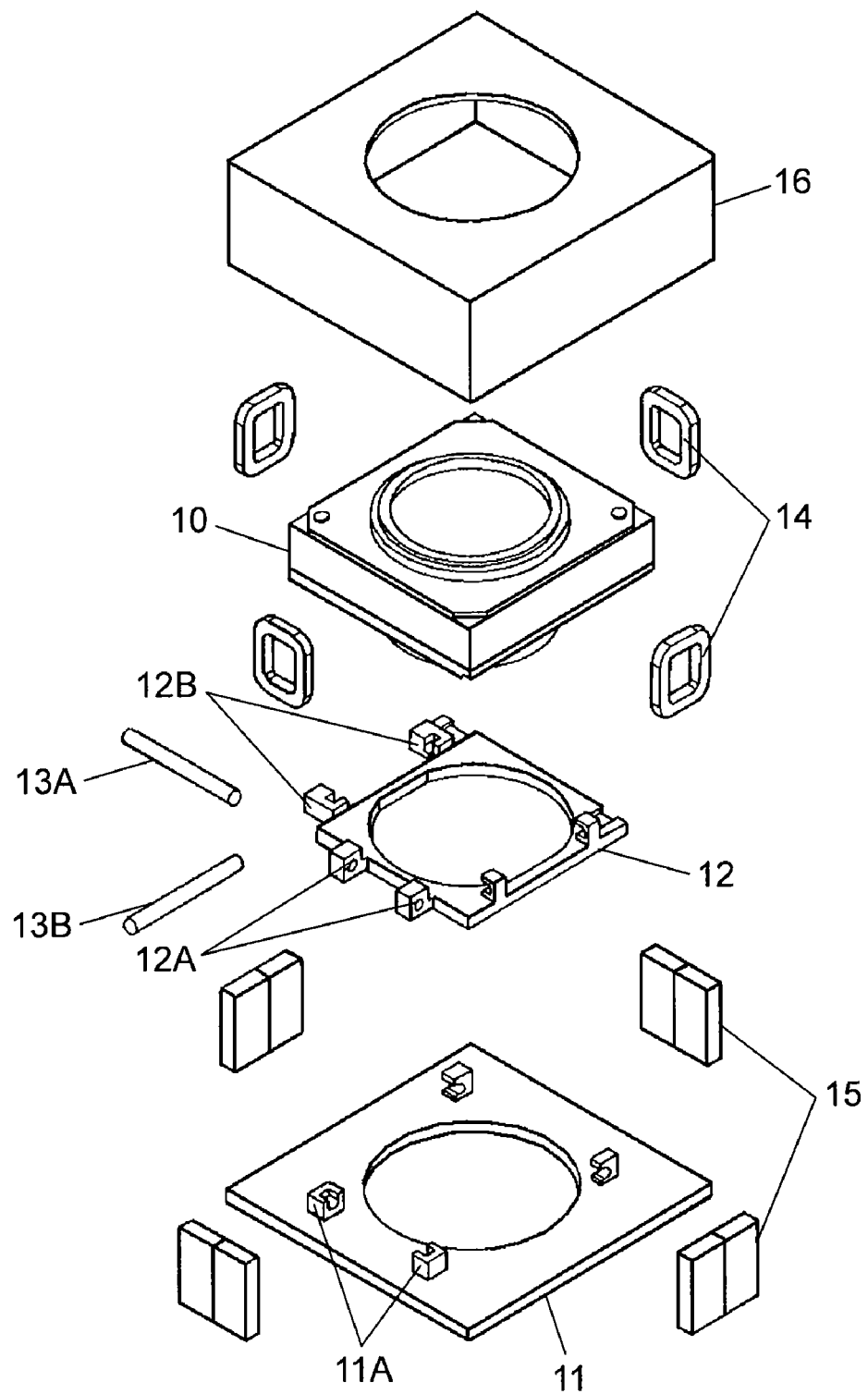
FIG. 10 is an exploded perspective view of the conventional lens actuator.
Figure 11:
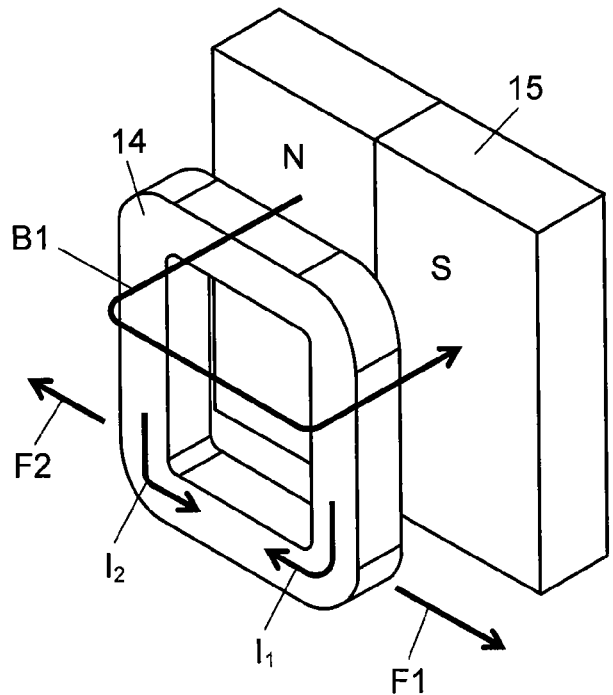
FIG. 11 is a partial perspective view of the conventional lens actuator.
Figure 12:
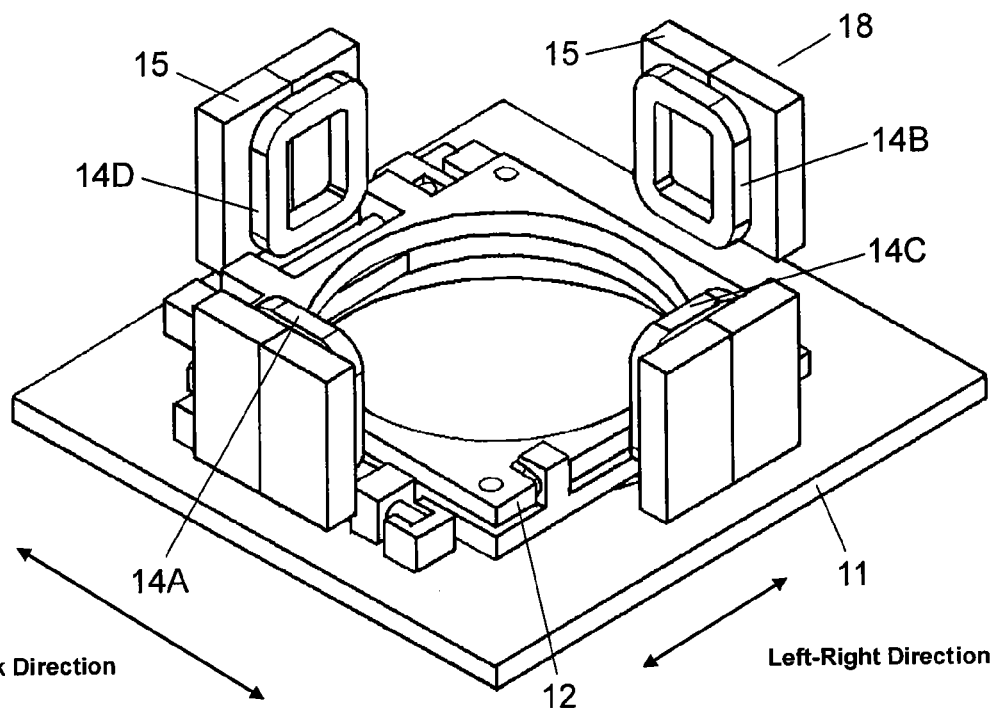
FIG. 12 is another partial perspective view of the conventional lens actuator.

FIG. 7 is a sectional view of a lens actuator according to the present embodiment, and FIG. 8 is an exploded perspective view of this lens actuator.

Unlike the first embodiment, magnets 27 are fixed to the front- and right-sides of the bottom surface of the outer periphery of yoke 23, and coils 26 are fixed to the top surface of base 25. Magnets 27 and coils 26 are arranged facing each other in the vertical direction (the first direction).

In short, the vertical arrangement of magnets 27 and coils 26 is opposite to the case shown in FIG. 3. It is, however, the same as in the first embodiment that the magnetic field B2 of magnets 27 is directed in the vertical direction (the first direction), and does not affect coil 32 and magnets 34 arranged inside.

Base 25 has a first surface (the top surface in FIG. 7) facing magnets 27, and a second surface (the bottom surface in FIG. 7) opposite to the first surface. The first surface has coils 26 fixed thereto. The second surface has moving yokes 28 (hereinafter, yokes 28) fixed thereto with a predetermined space from magnets 27 and coils 26. Yokes 28 are made, for example, of iron. Coils 26, magnets 27, yokes 28, base 25, and other components together form move part 30. Move part 30 and drive unit 20 are coated with cover 16, and there is provided a spacer 29 on the top surface of yoke 23 so as to form the lens actuator.

Thus, opposite to the first embodiment, in the present embodiment, coils 26 are fixed to the top surface of base 25, and magnets 27 are fixed to the bottom surface of yoke 23 so as to face coils 26 in the vertical direction (the first direction). Furthermore, yokes 28 are fixed to the bottom surface of base 25 with a predetermined space from magnets 27. As a result, between magnets 27 and yokes 28, a constant attractive force is generated from the magnetic force of magnets 27.

As shown in FIG. 7, the magnetic force between magnets 27 and yokes 28 attracts yoke 23 having magnets 27 fixed thereto and case 24 toward base 25 having yokes 28 fixed thereto. Therefore, between the bottom surface of support holes 24A and the bottom surface of support pin 33, there is a gap "t". In other words, the top surface of support holes 24A and the top surface of support pin 33 are in close contact with no gap between them. Thus, case 24 is held by base 25 without wobbling in the vertical direction (the first direction).

In the present embodiment, when the user lightly presses, for example, a push button (not shown) of camera as an electronic device, the electronic circuit applies voltage to coil 32 so as to supply current thereto in the same manner as in the first embodiment. This allows carrier 21 including coil 32 wound therearound and fixed thereto to move in the vertical direction (the first direction), allowing the auto focus to adjust the focal position of the lens in the hollow of carrier 21.

When the user strongly presses the push button of camera, causing blurring, the blurring is detected by the electronic circuit of the electronic device through, for example, a separate sensor (not shown). Then, the electronic circuit applies voltage to coils 26 so as to supply current thereto. As a result, opposite to the first embodiment, magnets 27 are subjected to a force in the back-and-forth or right-and-left direction. This allows magnets 27 and yoke 23 of drive unit 20 to which magnets 27 have been fixed to move in the back-and-forth or right-and-left direction, thereby correcting blurring.

In this case, coils 26 and magnets 27 outside carrier 21 are arranged facing each other in the vertical direction (the first direction), and the magnetic field B2 of magnets 27 is directed not inward, but in the vertical direction (the first direction). Therefore, the magnetic field B2 of magnets 27 outside carrier 21 does not affect coil 32 and magnets 34 inside. Thus, the same as in the first embodiment, carrier 21 having the lens in its hollow moves reliably and stably in the vertical direction.

In the present embodiment, as described above, yokes 28 are fixed to the bottom surface (the second surface) of base 25 with a predetermined spaced from magnets 27. Therefore, the magnetic force of magnets 27 attracts base 25 in the vertical direction (the first direction). The attractive force between magnets 27 and yokes 28 allows case 24 and yoke 23, that is, drive unit 20 to be held on base 25 without wobbling in the vertical direction. Thus, carrier 21 moves reliably without wobbling in the back-and-forth and right-and-left directions.

When the top surface of support holes 24A and the top surface of support pin 33 are in close contact with each other and there is no wobbling between case 24 and base 25, the voltage to be applied from the electronic circuit to coils 26 may be intermittent like a pulse, instead of continuous for a predetermined time. As a result, carrier 21 moves more reliably in back-and-forth and right-and-left directions.

The attractive force between magnets 27 and yokes 28, that is, the magnetic force of magnets 27 can be set to a predetermined magnitude to hold case 24 and carrier 21 in position even when no voltage is applied to coils 26. In this case, when shaking correction (optical image stabilization) is unnecessary, carrier 21 can be held in the center position without consuming any electric power.

As described hereinbefore, the lens actuator of the present embodiment can, in addition to providing the effect of the first embodiment, prevent wobbling, for example, between case 24 and base 25, and allow carrier 21 to move reliably in back-and-forth and right-and-left directions.

INDUSTRIAL APPLICABILITY

The lens actuator of the present invention, which operates reliably and stably, is mainly useful to actuate a lens of a camera, a mobile phone, and other similar devices.

What is claimed is:

1. A lens actuator comprising:
a cylindrical carrier having a hollow for accommodating a lens, the hollow being formed in a first direction;
a driving yoke for housing the carrier;
a base for holding the driving yoke thereon;
a driving magnet fixed to one of an outer periphery of the carrier and the driving yoke;
a driving coil fixed to one of the outer periphery of the carrier and the driving yoke;
a moving magnet fixed to the driving yoke; and
a moving coil fixed to the base, wherein
the carrier is movable with respect to the driving yoke in the first direction,
the driving yoke is movable with respect to the base in a second direction perpendicular to the first direction,
when the driving magnet is fixed to the outer periphery of the carrier, the driving coil is fixed to the driving yoke,
when the driving magnet is fixed to the driving yoke, the driving coil is fixed to the carrier,
the driving magnet and the driving coil face each other in the second direction, and
the moving magnet and the moving coil face each other in the first direction.

2. The lens actuator of claim 1, further comprising:
a support member fixed to the base and movably holding the driving yoke in the second direction.

3. The lens actuator of claim 1, wherein
the base has a first surface facing the moving magnet, and a second surface opposite to the first surface,
the first surface has the moving coil fixed thereto, and
the second surface has a moving yoke fixed thereto, the moving yoke facing the moving magnet in the first direction.

4. The lens actuator of claim 3, wherein
the magnetic force of the moving magnet attracts the base in the first direction.

5. A lens actuator comprising:
a cylindrical carrier having a hollow for accommodating a lens, the hollow being formed in a first direction;
a driving yoke for housing the carrier;
a base for holding the driving yoke thereon;
a driving magnet fixed to one of an outer periphery of the carrier and the driving yoke;
a driving coil fixed to one of the outer periphery of the carrier and the driving yoke;
a moving magnet fixed to the base, and
a moving coil fixed to the driving yoke, wherein
the carrier is movable with respect to the driving yoke in the first direction,
the driving yoke is movable with respect to the base in a second direction perpendicular to the first direction,
when the driving magnet is fixed to the outer periphery of the carrier, the driving coil is fixed to the driving yoke,
when the driving magnet is fixed to the driving yoke, the driving coil is fixed to the carrier,
the driving magnet and the driving coil face each other in the second direction, and
the moving magnet and the moving coil face each other in the first direction.

6. The lens actuator of claim 5, further comprising:
a support member fixed to the base and movably holding the driving yoke in the second direction.

* * * * *